United States Patent [19]

Voigt et al.

[11] Patent Number: 4,464,425

[45] Date of Patent: Aug. 7, 1984

[54] FOAMED POLYMERIC SHRINK-FIT OBJECTS AND THEIR PROCESS OF MANUFACTURE

[75] Inventors: Hermann U. Voigt, Langenhagen; Eckard Schleese, Stadthagen, both of Fed. Rep. of Germany

[73] Assignee: Kabel-und Metallwerke Gütehoffnungshutte Aktiengesellschaft, Hanover, Fed. Rep. of Germany

[21] Appl. No.: 226,539

[22] Filed: Jan. 19, 1981

[30] Foreign Application Priority Data

Jan. 15, 1980 [DE] Fed. Rep. of Germany ....... 3001159

[51] Int. Cl.$^3$ .............................................. B29D 27/00
[52] U.S. Cl. ........................................ 428/35; 138/89; 138/99; 138/137; 138/141; 138/178; 138/DIG. 9; 174/DIG. 8; 264/22; 264/46.1; 264/230; 264/342 R; 264/DIG. 18; 264/DIG. 71; 425/379 R; 425/817 C; 428/36; 428/318.6
[58] Field of Search ........... 264/DIG. 18, 230, 342 R, 264/DIG. 71, 45.9, 46.1, 22, 40.6, 25; 525/479; 425/379 R, 382 R, 817 C; 138/89, 99, 137, 141, 178, DIG. 9; 174/DIG. 9; 428/35, 36, 318.6

[56] References Cited

U.S. PATENT DOCUMENTS

| | | | |
|---|---|---|---|
| 2,653,352 | 9/1953 | Gliss | 425/382 R X |
| 3,126,680 | 3/1964 | Baird et al. | 264/230 X |
| 3,137,745 | 6/1964 | Johnstone | 264/DIG. 18 |
| 3,331,900 | 7/1967 | Thomas | 264/45.9 X |
| 3,416,190 | 12/1968 | Mehnert | 425/382 R X |
| 3,448,182 | 6/1969 | Derbyshire et al. | 264/230 X |
| 3,561,053 | 2/1971 | Pearson | 425/382 R X |
| 3,716,391 | 2/1973 | Hosoda et al. | 525/479 X |
| 3,782,870 | 1/1974 | Schippers | 264/46.1 X |
| 3,819,777 | 6/1974 | Vermeerbergen | 264/40.6 |
| 3,855,376 | 12/1974 | Ono et al. | 264/46.1 |
| 3,959,052 | 5/1976 | Stanek | 264/230 X |
| 4,033,929 | 7/1977 | Stiles et al. | 264/230 X |
| 4,034,131 | 7/1977 | Rhoads | 264/230 X |
| 4,049,757 | 9/1977 | Kammel et al. | 264/DIG. 18 |
| 4,054,403 | 10/1977 | Hornbeck et al. | 264/45.9 X |
| 4,076,477 | 2/1978 | Hacke | 425/382 R X |
| 4,081,231 | 3/1978 | Herrington | 425/382 R X |
| 4,101,699 | 7/1978 | Stine et al. | 264/25 X |
| 4,107,247 | 8/1978 | Dukess | 264/45.9 |
| 4,110,396 | 8/1978 | Reynolds | 264/230 X |
| 4,165,212 | 8/1979 | Ziegler | 425/382 R |
| 4,207,364 | 6/1980 | Nyberg | 264/230 X |
| 4,228,255 | 10/1980 | Fujimoto et al. | 264/176 R X |
| 4,333,898 | 6/1982 | Schmidtchen | 264/50 |

FOREIGN PATENT DOCUMENTS 594250  3/1960  Canada ............................. 525/479

OTHER PUBLICATIONS

"Hackh's Chemical Dictionary", Fourth Edition, completely revised and edited by Julius Grant, New York, McGraw-Hill, ©1972, p. 334.

Primary Examiner—Philip E. Anderson
Attorney, Agent, or Firm—Ralf H. Siegemund

[57] ABSTRACT

A shrink-fit article is made by extruding a silane-grafted polymer which foams, at least at its surface, and cross-links. Upon completion of foaming and cross-linking, the article is expanded while (still) warm and cooled in the expanded state.

18 Claims, 5 Drawing Figures

FOAMED POLYMERIC SHRINK-FIT OBJECTS AND THEIR PROCESS OF MANUFACTURE

BACKGROUND OF THE INVENTION

The present invention relates to shrink-fit objects such as shrink hoses, shrink sleeves, shrink caps, or the like.

Austrian patent No. 188,510, dated Jan. 25, 1957, discloses a method for making shrink hoses by extruding or injection-molding a hose from a thermoplastic material, but having a smaller diameter than the hose to be made. The extruded hose is then expanded by means of air pressure and cooled to fix its expanded dimension. The hose is later shrunk through application of heat and will contract to a reduced diameter for a shrink fit. The particular thermoplastic hose, e.g. a polyvinylchloride hose, does not achieve a sufficient stabile temperature and does not have an adequately elastic memory, in that it will not shrink exactly to its original dimensions established upon extrusion.

A particular product is known and traded under the designation "THERMOFIT" which is a high-density polyolefin to be used for injection-molding particular shapes. These parts are subsequently subjected to high-energy electron rays in order to obtain a cross-linked, three-dimensional lattice assembly of the molecules. Such a shape is quite strong mechanically, is creep-resisting, does not tear, and has an elastic memory. Upon making a hose or sleeve in that fashion and slipping it upon the object to be covered, shrinkage is obtained by briefly heating the sleeve above the crystallization point, at about 135° Celsius. The sleeve will, thereupon, return rapidly to its original shape and dimension, and a truly strong cover is obtained.

The method as described in the preceding paragraph is applicable to other base polymers, also to modified polymers, depending upon any special requirements during its use. The critical aspect of this method, however, is the cross-linking by means of electronic beams, prior to heating and expansion. Such a method is, therefore, quite expensive for reasons of the requisite equipment, and also for reasons of providing adequate protection for persons involved.

DESCRIPTION OF THE INVENTION

It is an object of the present invention to provide new and improved shrink-fit objects having an elastic memory and having features at least as good and versatile as articles made with cross-linking by means of radiation, but requiring less material.

In accordance with the preferred embodiment of the present invention, it is suggested to make these articles of a cross-linked material so that the surface strata of these articles are comprised of foam, i.e., the material of which such an article is made is converted, at its surface, at least partially, into foam. Aside from being lighter, such an article has inherently a larger resistance to heat transmission; but the cross-linking fortifies the cell or pore structure, giving it considerable mechanical strength. In the preferred form of practicing the invention, the material being amenable to cross-linking, is extruded and/or molded, whereby the development of the foam occurs during the shaping. Preferably, the shrink-fit object is of a hollow configuration, and such an object is directly extruded as a hollow string. In the case of injection molding, the mold is preferably charged by means of an extruder. In a preferred form of practicing the invention, the material is to be made of an olefin-polymerisate or olyfin-copolymerisate in which silane or a silane compound has been grafted and cross-linked, at a degree of from 30% to 80% cross-linking. In the preferred form, this base material is grafted in an extruder; and downstream, in that same extruder, foaming commences in order to obtain the foam-developing blowing as the product (such as a hose) leaves the extruder. Silane molecules, grafted on a polyolefin, will cross-link in the presence of moisture. This grafted-on material is shaped into an object having the shape that the final product will ultimately have, after heat-shrinking has been provided in situ at a later time. Presently, moisture cross-linking is to occur, or to be initiated, prior to or during shaping. Foaming occurs prior to or after the onset of cross-linking. Foaming and cross-linking are to be completed prior to physical expansion as the object is maintained at a shape similar to the ultimate heat-shrunk shape.

Following completion of foaming and cross-linking, the object is physically expanded as a whole at an elevated temperature which, in turn, is followed by cooling so that the object maintains its expanded configuration until heat is again applied, causing the object to shrink back to the shape in which it cross-linked. It should be noted that expansion for foaming (i.e., blowing) should be distinguished from physical expansion of the object as a whole to obtain the final configuration. The terms "expansion" and "expanding" are used hereinafter exclusively for describing the physical expansion as a whole and not the foaming process. The cross-linking as well as the foaming may already commence when the material is being given its shape (extruder head, mold); cross-linking and foaming may even be completed in the mold or completed merely by exposure to the atmosphere, possibly being enriched in moisture (steam). Alternatively, the shape may be cross-linked, at least to a significant extent after shaping, but as the shape is being maintained, under utilization of a suitable device (tank) exposing the shape to water.

The invention makes use of a discovery by one of us and another that, pursuant to the grafting of low-molecular compounds (e.g., organo-silane) onto the marcomolecules of a polymer, secondary reactions thereof produce polyfunctional chain-linking, resulting in "bundled" cross-linking points or nodes, whereby a single cross-linking node fixes (links) several macromolecules simultaneously via the silane. This particular chemical cross-linking mechanism leads to large bonding forces of the molecules. Upon heating, or at an elevated temperature, there is some loosening of the bond which permits an expansion and "freezing" in the expanded configuration on cooling; but upon reheating, the original shape is restored exactly by shrinking. Thus, the moisture cross-linking of the material of the shaped object results directly in the generation of an elastic memory condition and configuration for the article, which memory is retained after expansion. The preferred application of the invention is the making of hoses, sleeves, and caps, to be used as gas-tight and moisture-proof covers for cable ends, cable or tube splices, or other connections and joints for cables, tubes, and so forth.

The invention now is specifically based upon the discovery that the mechanical strength of foamed, insulating synthetics depends not only upon the properties of the base polymer, but also on the number, size, and distribution of the pores and cells which were formed upon foaming. The smaller these pores and the more uniformly they are distributed, the stronger will the article become. One may also say that the more viscous the melt is at the instant of foaming, the more uniform will be the distribution of the cells. This aspect has physical-chemical reasons. Pore size and structure depends decisively upon the vapor pressure of the blowing agent and the surface tension of the melt. The surface tension is greater for a higher viscosity. In the past, it was a common practice to lower the viscosity of a melt immediately prior to foaming by lowering its temperature. This, however, is an expensive approach, requiring, e.g., rather long extruders. It is, therefore, much more appropriate to increase the viscosity by cross-linking.

In order to practice the inventive method, the object or article is extruded or injection-molded, the mold being charged by an extruder. The article thus made has the "contracted" configuration, but at least surface-near strata have been foamed, partially or completely, upon molding and/or shaping by the extruder. That article is also cross-linked to the desired degree because, preferably, the onset of cross-linking has preceded the foaming. Foaming (blowing) the material, when cross-linking has already begun, is of advantage for obtaining the formation of the cell structure in the highly viscous material. The resulting cell structure has small pores which are evenly distributed. The cross-linked and foamed object is now expanded and heated (or is still hot) and cooled in its expanded state. The expanded state is retained; but upon subsequently reheating the object, it contracts on account of its elastic memory.

Graft cross-linking is preferred; but other modes can also be used, for example, by exposing the article to high-energy radiation before, during, and/or after foaming.

In the case of moisture-cross-linking material, one may use chemical blowing agents. However, if foaming and grafting occur at the same stage (though separated in time), one still has to take care that the foaming agent which was added to the blend prior to grafting, does not produce by-products that interfer with the grafting. It is, therefore, preferred to use a physically acting foaming agent. For example, one may use low, fluorinated or chlorinated hydrocarbons or nitrogen. These agents produce a considerable degree of foaming, small pores, and a uniform cell structure, resulting in strong, stable configurations of the cross-linked product, without interference in the grafting process.

It is of advantage to use the foaming agent as a carrier for at least a portion of the moisture needed for moisture-cross-linking. Thus, one may introduce a moist gas, e.g. pressurized water vapor (steam) and carbon dioxide, into the blend which causes cross-linking in a short time, particularly from the inside as the cell walls are being formed. The overall residence time for the object in water (for purposes of further cross-linking) can thus be reduced.

The blowing agent (whether or not it is a moisture carrier) can be added conventionally to the polymer plus the graft component blend. It is easier, however, to provide the polymer as a powder and to blend it with the blowing agent in an appropriate mixer. It can also be of advantage to prepare two batches: one for grafting with the olefin-polymer or copolymer; and a second batch of the same polymer or copolymer, but with the foaming agent added. Both batches are then blended.

Another way of stabilizing the cell walls of the pores, as they are being formed by causing them to begin to cross-link, is to use a blowing agent which, as it decomposes, releases water as one of its by-products. Such a material is, for example, benzine-sulfohydrafide and can be added to the blend (or a batch, as described earlier) so that, upon heating the blend by and in the extruder to the decomposing temperature, blowing and cross-linking begin at the same time.

Initiating cross-linking internally by using a moist-blowing gas or a water-releasing blowing agent has the added advantage that subsequently, i.e., after completion of shaping, the residence time of the article (e.g., in a water tank or other exposure to moisture) is reduced. This is particularly of interest in the case of continuous production of a hose (later to be cut into shrink sleeves) which passes through a water tank, or the like. The amount of water picked up by the hose may be insufficient to complete the cross-linking.

As was mentioned earlier, it is a specific feature of the invention that the blowing should commence when the material has already begun to cross-link. In the case siloxane, cross-linking, i.e. cross-linking through exposure to water, the blend should contain additives which release water, e.g., when the blend reaches (or prior to its reaching) the decomposition temperature of the blowing. In this case, silane grafting occured earlier and, upon further heating, the material will begin to cross-link on account of the release of water within the material itself. Now, the blowing agent decomposes, and the cells and pores are generated as their wall structure is and continues to cross-link.

A particular approach here for providing the requisite amount of water for the moisture-cross-linking of the cell's wall resides in the utilization of nonhygroscopic metal oxides, such as tin oxide or zinc oxide. Again, it is assumed that siloxane cross-linking is employed. Immediately after shaping, these oxides lead directly to a cross-linking at a degree of 30%. The cross-linking, as resulting, e.g., from the additon of zinc oxide, produces a noticeable increase in melt viscosity. Such increase occurs over and beyond the increase in viscosity due to grafting. The melt is, thus, quite viscous so that the resulting pore structure is very fine and evenly distributed as desired. The metal oxide may be added after the grafting has been completed; this way, one will avoid premature cross-linking during grafting.

Zinc oxide has further advantages. For example, it is known that the zinc oxide enhances the kinetics of the decompositioning process of the blowing agent. The decomposition temperature is reduced, possibly considerably, when the zinc oxide is present. This, in turn, means that blowing can begin at a rather low temperature, a feature that is also instrumental in improving the foam's structure. The fact that little or no undecomposed blowing agent remains in the object is also of advantage in regard to the electric properties of the shrink-fit article.

Grafting and foaming, though consecutive steps, will be carried out in preferably one and the same process step; e.g., while the material is melted and heated in an extruder. This increases operational safety and reduces the possibility of external interference. The same advantage remains if the final object is composed of foamed and unfoamed strata, as explained next.

If the article to be made is to have foam only in a surface-near layer, one may proceed as follows. A suitable extruder is used with separate barrels and/or separate intakes of pressurized material. The head produces, for example, concentric layers in a hose. An inner hose will have the material that is used without blowing agent to produce a solid material for the hose while a physically expandable foaming layer of otherwise like material is extruded on top of and around that solid-material hose. The resulting two-ply hose has, thus, a solid portion and a foam layer.

In one preferred form of practicing the invention, cross-linking is carried out at an elevated temperature of above 80° C., but not higher than about 200° C., preferably in a range of 140° C. to 180° C., if that particular, thermally enhanced cross-linking is carried out or continued after the shaping proper has been completed. The expansion may now be carried out when the object is still hot, i.e. on line; and thereafter, the object will cool and "freeze" in the expanded configuration. The cross-linking may already commence and proceed during the initial molding or extruding process in which the product is given its shape. In this case, positive exposure to moisture of the product, subsequent to shaping proper, can be dispensed with. This is particularly the case when the material contains additives which will release water upon heating, such as aluminum oxide hydrate.

Whenever cross-linking is not possible, or only insufficiently possible while the shape resides in the shaping tool (die, mold, and so forth), the shape may be passed through a steam atmosphere, analogous to a sauna, at a rather high temperature. Alternatively, one may use a hot glycerin water bath or a hot oil water bath or water mixed with polyalcohol, such as ethylene glycol and homologes thereof. Aside from a rather uniform temperature, this has the following advantage. The bath's components, which are better compatable with the polymer than water, speed the diffusion of the water into the grafted polymer in order to obtain the cross-linking.

The base material can be any polymer permitting radically initiated grafting, particularly of organo silane. For reasons of working, polyethylene or an ethylene copolymer with vinylacetate or acrylate comonomer are preferred. One may also use ethylene propylene rubber, possibly blended with polypropylene.

The organo silane is preferably vinyltrimethoxy silane under utilization of a relatively small amount of a catalyst, preferably dibutyl-tin-dilaurate. The amount of organo silane needed can be taken by analogy to peroxidic cross-linking. The molar ratio of peroxide-generating, radical sites at the macromolecules to silane is preferably about 1:10. This way, one ensures that the requisite molecular bonding forces are, indeed, available for causing the expanded object to shrink back to its "memorized" configuration.

In addition, one may use use certain fillers which should be nonhygroscopic, if possible even hydrophobic, so that the moisture cross-linking is not interfered with; any H$_2$O molecules should be available for the cross-linking and not be absorbed or trapped, otherwise. A particular filler of interest is carbon black (soot) for reasons of enhancing resistance against ultraviolet radiation. So-called acetylene black is very suitable here for reasons of its nonhygroscopic properties. This particular type of carbon black has a high conductivity and relatively low quantities; e.g., 1.5 to 3.0 parts (by weight) per 100 parts of polymer suffice to provide the object with a desirable resistivity to ultraviolet radiation. Also, this type of additive does not interfere with the grafting.

As mentioned above, one may use still other additives, namely those of the type which release a definite amount water at higher temperatures. These additives may be provided in addition to carbon black. This gives the assurance that cross-linking begins already in the die or mold, i.e., right in the shaping tool, possibly even during shaping or in an extruder head. Suitable additives for this purpose are, for example, silicic acid made partially hydrophibic or silicates or aluminum oxide hydrate. The latter decomposes at a temperature of above 180° C. as per the relation $$2Al(OH)_3 \rightarrow Al_2O_3 + 3H_2O.$$

A particularly useful product for purposes of the invention is an aluminum oxide hydrate traded by the company Martinswerk under the designation "Martinal A-S." The silanized version is traded under the designation "Martinal A-S/101." These fillers have on the average a grain size of about 0.4μ, and particularly the silanized additive is very compatible with polyethylene.

DESCRIPTION OF THE DRAWINGS

While the specification concludes with claims, particularly pointing out and distinctly claiming the subject matter which is regarded as the invention, it is believed that the invention, the objects and features of the invention, and further objects, features, and advantages thereof, will be better understood from the following description taken in connection with the accompanying drawings, in which:

Proceeding now to the detailed description of the drawings, FIG. 1 illustrates an extruder 2 having an inlet hopper to be charged with a granulated blend of the following composition (all parts by weight):

Figure 1:
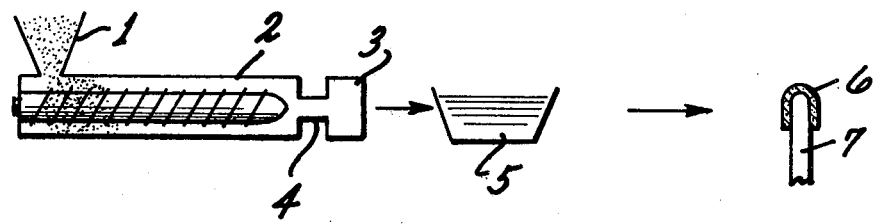
FIG. 1 is a schematic view of an equipment for practicing the preferred embodiment in accordance with the best mode thereof for making caps.

| | |
|---|---|
| 100 parts | polyethylene homopolymer (0.94 g/cm$^3$ density, 0.2-2.5 melt index) |
| 1.0-1.5 parts | vinyltrimethoxysilane |
| 0.03-0.05 parts | dicumylperoxide |
| 0.05 part | of a graft catalyst, e.g. NAFTOVIN SN/L (dibutyl-tin-dilaurate) |
| 2.5 parts | carbon black (acetylene black Y) |
| 0.5-1.5 parts | azodicarbonamide (blowing agent) |

Actually, one may charge the extruder with the individual components and rely on the blending capabilities of the barrel-and-screw combination. It is, however, advisable to premix and homogenize the PE and the filler (e.g., soot). In any event, the material (PE) will melt in the extruder 2 and will be homogenized therein. Since a graft catalyst and a radical site initiator have been added, the silane will be grafted on the polymer when a temperature of above 140° C. has been reached. The temperature should, preferably, rise to from 160°

C. to 200° C. The blowing agent decomposes at about 180° C.

The extruder nozzle 4 feeds a shaping tool such as a die or mold 3 for making caps. Thus, the molding process is actually analogous to injection-molding using an extruder for the preparation of the raw material, a homogenized blend of silane-grafted PE. Some cross-linking will occur already in the mold because there is some residual water in the blend. However, the product will be cooled for taking it out of the mold but not down to room temperature.

The caps as made are still quite hot (80° C.), and it is advisable to use that thermal content for obtaining an accelerated cross-linking in a moist atmosphere or environment. As schematically indicated, a tank 5 filled with an oil water emulsion or a water glycerin blend is provided to receive the caps made. This bath keeps the temperature constant (by suitable heating) and accelerates the cross-linking process further by direct exposure of the objects to water. The temperature is above 80° C., preferably between 140° C. and 180° C., and possibly as high as 200° C. The caps as made remain in that bath for a certain period of time such as 3 min. to 30 min., and, while still warm, are taken out and expanded. Reference numeral 7 denotes a mandrel, or the like, upon which a cap, such as 6, is slipped. It is important that the caps be expanded while the cross-linked material is heated to a temperature above the crystallization point of melting. The heat content of the product, acquired during the cross-linking, should be used as much as possible during the expansion. Thus, expansion should follow immediately upon completion of cross-linking in the bath and removal of the caps from the bath. The mandrel may additionally be provided with apertures to blow air into the cap and expand it. The cap is permitted to cool in this expanded state, to "freeze" this configuration even after expansion pressure is relieved.

Providing cross-linking by means of a water bath is practical, particularly in the case of continuous production; but it is not essential in principle, exposure to steam may suffice. In other instances, the moisture content of the polymer or of any additive may suffice to obtain cross-linking already in the mold 3. Subsequent exposure to moisture may be needed merely to complete cross-linking.

The otherwise completed object (cap, and so forth) may subsequently be coated on the inside with a melt adhesive on the base of polyamid or polyester, to enhance bonding when the object is subsequently heat-shrunk.

Figure 2:
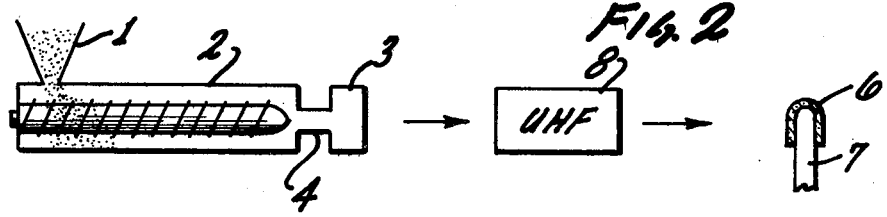
FIG. 2 is a similar view of a modified equipment.

The example shown in FIG. 2 includes similar molding equipment; also, the expansion process for a cap is the same, at least in principle. It is, however, assumed that no extensive exposure of the cap to water is needed. Rather, the blend used here for making a cap may include water-releasing substances, e.g. $Al_2(OH)_3$ (see one of the examples below). Partially hydrophobized silicate can also be used. In either case, the very hot material in the mold will release the requisite water throughout the material, and cross-linking occurs speedily, right in the mold, without requiring diffusions of water from the outside.

The completed product has been permitted to cool in the mold and will, next, be reheated in a microwave unit 8, prior to and for purposes of expansion. If carbon black is included in the material, ready absorption thereof and speedy heating is ensured.

It should be mentioned that in other cases, whenever a mere exposure to moisture suffices for cross-linking or completion of cross-linking, a microwave heater may be used to enhance or complete that cross-linking and to prepare the object for subsequent expansion as well.

Figure 3:
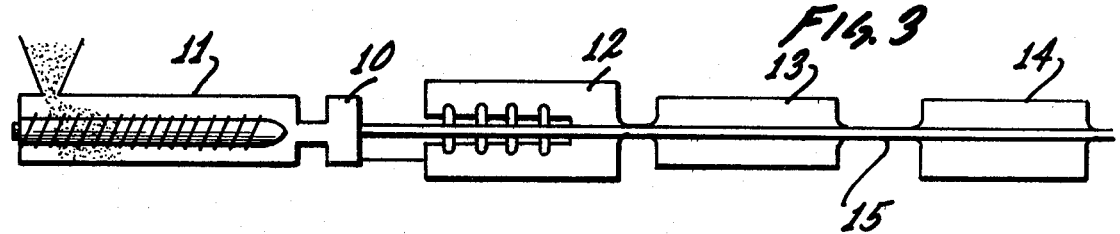
FIG. 3 is a schematic view of an equipment for making shrink hoses in accordance with the preferred embodiment and best mode of practicing the invention.

FIG. 3 illustrates an extruder 11 having an extrusion head 10 for making a hose 15 on a continuous basis. At least the surface layer of the hose has a foam consistency as it leaves the extruder. The material to be used is preferably the same or similar to the composition outlined above. This hose is fed into a vacuum calibrator 12, preventing it from collapsing having sizing rings for providing it with the dimensions which the final product is to have after shrink fit; in other words, the equipment 12 provides the hose with the dimensions it is to memorize. The internal pressure inside the hose serves also as an inflating support. The hose is next fed through a glycerin water bath 13 maintained at a temperature of from 130° C. to 180° C., preferably from 160° C. to 180° C. Since the hose is a continuous object, internal pressure continues to act upon the hose wall, for serving as a support and for preventing the hot hose from collapsing in the bath.

The hose passes next through a cooling tank 14, and the cooled hose may then be cut into the desired lengths. The cooling step is needed here to make sure that the shape remains stable. The hoses, sleeves, hollow fittings, and so forth, as subsequently cut, do have, at this point, a diameter which is to be memorized and will be memorized by operation of the cross-linking which is now completed. Next, the hoses, sleeves, and so forth, will be expanded, e.g. by slipping them over mandrels. Preheating will be necessary, e.g., by operation of microwave heating, as described earlier. A highly suitable method of expanding an uncut hose is disclosed by one of us and others in a companion application of common assignee, Ser. No. 201,183, filed Oct. 27, 1980.

Figure 3A:
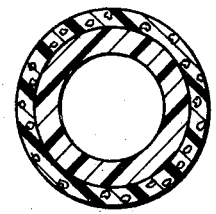
FIG. 3a is a cross section through a shrink sleeve.

This example also serves to demonstrate the making of multiple ply shrink sleeves in which different materials are extruded by a concentric extruder head. One may use here the material of the example above for obtaining a foam surface layer underneath which there is a hose of the same material, but without the blowing agent. The resulting sleeve (after the hose has been expanded as a whole and cut) has a consistency as shown in FIG. 3a; there is a solid inner sleeve carrying an outer sleeve of foam, but of the same cross-linked polymer.

Figure 4:
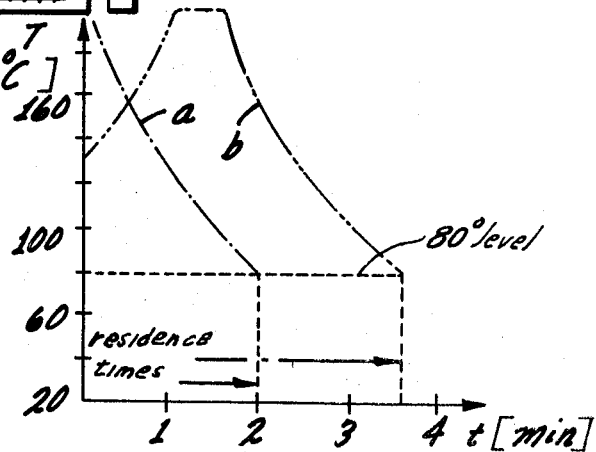
FIG. 4 is a diagram showing temperature versus time for different materials.

FIG. 4 compares a known process with the present process, particularly in regard to peroxide cross-linking. The silane-to-peroxide ratio (molar values) is to be at least 10:1. Trace "a" depicts moisture cross-linking; trace "b" depicts peroxide cross-linking; both are plotted against time, with time "O" being the instant that the material leaves the extruder or is injected into a mold, as schematically indicated.

As far as moisture cross-linking is concerned, the PE blend to be grafted and being grafted is heated in the extruder by means of heat conduction through the wall of the extruder barrel, being heated. Also, the worm creates significant amount of friction, including shear forces in the blend which are dissipated internally as heat. As the temperature rises, grafting occurs. Cooling of the material begins on the transition from the extruder to the mold. This is, in fact, the meaning of curve "a." The object resides for two minutes in the mold during cooling, whereupon it is removed. Silane moisture cross-linking has begun in the mold and may have to be completed as outlined above.

In the case of peroxidic cross-linking, the temperature must not exceed 130° C. as cross-linking is not to begin prior to charging of the mold. No such limit exists for moisture cross-linking. Hence, the particular material must be heated in the mold in order to obtain the cross-linking temperature of 200° C., reside in the mold for one minute or so at that temperature, followed by cooling, when still in the mold. Total residence time is, thus, considerably longer than in the case of moisture cross-linking. Moreover, the energy consumption is higher in a peroxidic cross-linking method because one must cool the material so that it will not exceed 130° C. prior to entry into the mold. That active cooling of the peroxidic cross-linking material consumes more energy than heating of a moisture cross-linking material in the extruder barrel, up to 200° C., particularly under utilization of all of the available heat-dissipating processes (friction).

In the following, additional examples are given for materials to be used for different kinds of shrink objects, in particular for caps; all parts are by weight.

| 100 parts | polyethylene copolymer (2 to 7 Mol % vinylacetate) |
| 0.5–1.5 parts | azodicarbonamide (blowing agent) |
| 3.0 parts | carbon black (Ketjen black E.C.) |
| 2.0 parts | vinyltrimethoxy silane |
| 0.05–0.1 parts | peroxide |
| 0.05 part | dibutyl-tin-dilaurate catalyst (NAFTOVIN SN/L) |

In another example, the carbon black content was increased to 5 parts and the blowing agent was specifically 0.8 part.

In yet another example (see particularly FIG. 2 for its usage), a filler is used which will decompose and release water, already prior to and during the shaping process.

| 100 parts | polyethylene homopolymer (density 0.94 g/cm$^3$, melt index 0.2 to 2.5) |
| 0.8–1.2 parts | diphenoloxide-4,4-disulfohydrazide (blowing agent) |
| 2.0–10 parts | aluminum oxide hydrate (e.g., Martinal A-S/101) |
| 10 parts | carbon black (aztylene soot NOIR Y 200) |
| 1.8–2.0 parts | vinyltrimethoxy silane |
| 0.05–0.1 parts | peroxide |
| 0.05 part | catalyst (dibutyl-tin-dilaurate) |

The aluminum oxide hydrate can be replaced by silicic acid made partially hydrophibic. In either case, this particular blend releases water in the mold, and even earlier than that. Thus, this particular composition is highly suitable for making caps because cross-linking has begun upon foaming and is, at least partially, completed prior to taking the article out of the mold.

Another example is representative of using a rubber base compound as base material:

| 100 parts | ethylene-propylene rubber (e.g., BUNA AP 407K) |
| 80 parts | propylene (e.g., HOSTALEN PPH 1050) |
| 5 parts | carbon (KETJEN black E.C.) |
| 1.5 part | vinyltrimethoxy silane |
| 0.1 part | peroxide (PERKADOX 14) |
| 0.05 part | catalyst (dibutyl-tin-dilaurate) |

-continued

| 0.5–1.5 parts | blowing agent (azodicarbon-amide) | a further example is representative of physical blowing:

| 100 parts | polyethylene-homopolymerisate (melt index 1.5 to 2.0) |
| 5 parts | carbon (KETJEN black E.C.) |
| 0.5–2.5 parts | physical blowing agent (trichlorofluor methane or dichlorofluor methane) |
| 1.8 to 2.0 parts | vinyl-tri-methoxi silane |
| 0.25 part | peroxide (e.g., LUPEROX 270) |
| 0.05 part | catalyst (dibutyl-tin-dilaurate) |

The invention is not limited to the embodiments described above; but all changes and modifications thereof, not constituting departures from the spirit and scope of the invention, are intended to be included.

We claim:

1. A shrink-fitting article such as a shrink hose, shrink sleeve, or shrink cap, made from a hollow article comprised of an extruded and cross-linked foam material, the hollow article as a whole having been expanded to a larger size following completion of cross-linking and foam expansion.

2. A hollow article as in claim 1, wherein the article has a foam surface layer and beneath the foam surface layer there is an unfoamed layer.

3. A method of making a shrink-fit article such as a hose, a sleeve, a cap, or the like, comprising the steps of extruding or injection-molding a silane-grafted polymeric material capable of cross-linking in the presence of moisture, under development of foaming, at least at the surface, in order to shape-form a hollow polymeric article in the configuration it is to have following a shrink fit;

causing the article as extruded to cross-link in the presence of moisture;

expanding the cross-linked and foamed article at an elevated temperature to obtain larger dimensions; and cooling the article in the expanded state to form said shrink-fit article.

4. A method as in claim 1, wherein the cross-linking is carried out by means of a high-energy radition rather than graft cross-linking by hydrolitic techniques.

5. A method as in claim 1, including the step of reheating the article following the foaming and the cross-linking, but prior to the expansion step.

6. A method as in claim 5, the reheating step being carried out by means of microwave radiation.

7. A method as in claim 1 or 2, including blending of the material with a foaming agent which will chemically decompose during the extruding.

8. A method as in claim 1 or 7, including blending of the material with a foaming agent which will physically expand during the extruding to thereby obtain the foaming.

9. A method as in claim 1 or 7, including blending of the material with an additive which releases water during the extruding so that cross-linking begins internally during shape-forming.

10. The method of making a shrinks-fit object, comprising the steps of providing a polymer blend with silane as a graft component;

causing the graft component to be grafted upon the polymer, the graft component being of the type for cross-linking the polymer molecules in the presence of moisture;

shaping the grafted-on polymer into a particular hollow object and causing at least a portion of the blend to foam by means of blowing in order to obtain at least partially a foamed surface;

exposing said grafted-on polymer to moisture for obtaining the cross-linking;

expanding the completely shaped and completely cross-linked object as a whole at an elevated temperature; and maintaining the expanded state as the object cools to obtain said shrink-fit object.

11. The method of making a shrink-fit article such as a hose, a sleeve, a cap, or the like, comprising the steps of providing a blend of a silane and a base polymer and a blowing agent;

extruding the blend to melt the blend and to graft the silane onto the base polymer, and to obtain foaming while forming the article;

causing the article to cross-link by exposure to moisture;

re-shaping the article prior to completion of cross-linking to form a hollow article;

expanding the hollow article as a whole and at an elevated temperature; and cooling the article in the expanded state to form a shrink-fit article.

12. A method as in claim 8 or 9, wherein the foaming step includes the introduction of a pressurized, moist gas into the blend so that foaming and onset of cross-linking concur.

13. A method as in claim 10 or 11, wherein the foaming step includes adding a water-releasing blowing agent to the blend so that foaming and onset of cross-linking concur.

14. A method as in claim 10 or 11, including the step of adding a filler to the blend which releases water in the extruder.

15. A method as in claim 11 as applied to extruding a shrink hose, including the step of expanding the hose when still warm from the extrusion.

16. A method as in claim 1 or 11, wherein the polymer material is polyethylene, a copolymer of ethylene, an ethylene-propylene rubber, by itself or blended with a polyolefin, such as polypropylene.

17. A method as in claim 1 or 11, comprising:
the step of adding nonhygroscopic carbon black to the blend.

18. A method as in claim 1 or 11, including providing a non-foamed substrate, said extrusion being carried out on said substrate so that said foam develops on the non-foamed substrate of the article.

* * * * *